Figure 1:
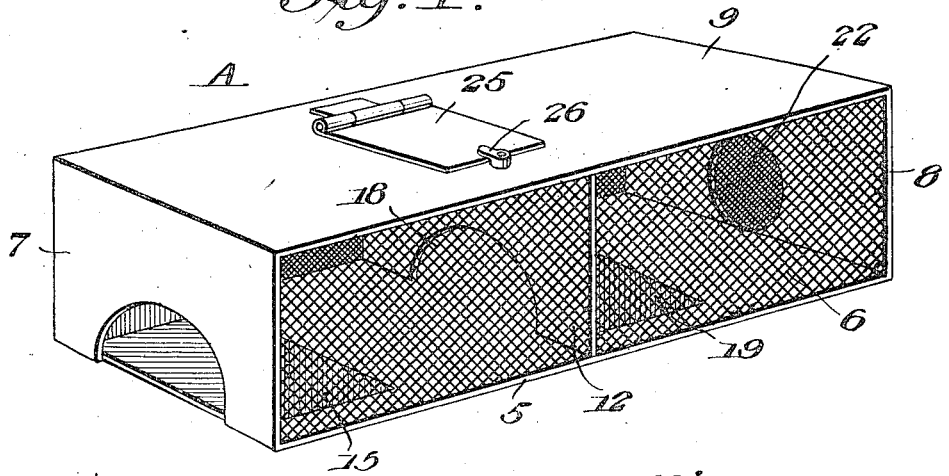

D. R. REEFE.
ANIMAL TRAP.
APPLICATION FILED OCT. 23, 1914.

1,151,041.

Patented Aug. 24, 1915.

Witnesses
Hugh H. Ott
Wm E. Palmer

Inventor
Dantes R. Reefe
By Victor J. Evans
Attorney

UNITED STATES PATENT OFFICE.

DANTES R. REEFE, OF MIAMI, FLORIDA.

ANIMAL-TRAP.

1,151,041.

Specification of Letters Patent.   Patented Aug. 24, 1915.

Application filed October 23, 1914. Serial No. 868,297.

*To all whom it may concern:*

Be it known that I, DANTES R. REEFE, a citizen of the United States, residing at Miami, in the county of Dade and State of Florida, have invented new and useful Improvements in Animal-Traps, of which the following is a specification.

This invention relates to that class of animal traps known as self and ever-set traps, and the primary object of the invention is the provision of a trap of this character wherein means are provided for attracting the animal in said trap, by providing a holder for the bait which will permit of the bait being visible to the animal previous to entering the trap, and to carry out this object, I employ a closure for the entrance opening of the trap also constructed of wire mesh.

Among other features of the invention embodies simplicity of construction, the invention residing in the specific construction, combination and arrangement of parts hereinafter more fully described.

In the drawing forming a part of this application, like numerals of reference indicate similar parts in the several views and in which:—

Figure 2:
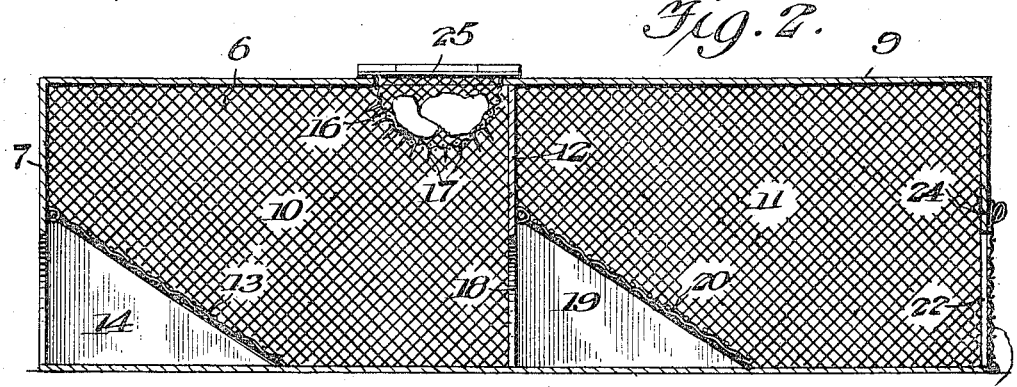
Figure 3:
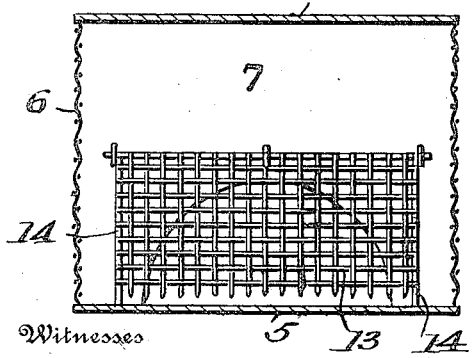
Figure 4:
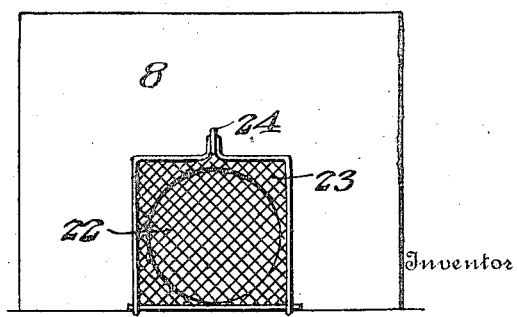

Figure 1 is a perspective view of the trap constructed in accordance with my invention. Fig. 2 is a longitudinal sectional view. Fig. 3 is a transverse sectional view. Fig. 4 is a rear end view.

My invention embodies a box-like structure A constructed from wire, metal or other suitable material, preferably the latter as shown, and comprises a bottom 5, side walls 6, front and rear end walls 7 and 8 respectively and a top 9. The structure is divided into longitudinal alining compartments 10 and 11 by means of the vertical partition 12.

The front end wall 7 is cut away as shown to provide an entrance passage into the trap, which is controlled by the door 13, the latter being hinged or pivoted to the inner face of the end wall for vertically swinging movement. The door comprises triangular shaped side pieces 14 normally seated upon the bottom 5, the wire netting 15 constituting the top portion thereof.

Extending within the compartment 10 through the opening in the top 9 and supported thereby at a point adjacent the point of juncture of the compartment 10 of the latter mentioned compartment with the compartment 11 is a cup-shaped bait holder 16 constructed from wire gauze.

It will be appreciated by those skilled in the art to which this invention relates that by constructing the gage holder of wire gauze, permits the bait to be visible to the animal, previous to entering the trap, and assisting in tempting or attracting said animal in said trap, and therefore the forming of the door 13 of a wire mesh or gauze, clearly supports this function.

The animal is first attracted by the odor of the bait, and induced to enter the trap through the passage in the end wall 7. In so doing he raises the door 13 and after entering the compartment 10 the door gravitates to closed position, thus preventing escape. It might here be stated that the free ends of the strands of wire forming the door terminate in sharp points and are slightly spaced above the bottom 5 so as to prick the animal in any attempt on his part to open the door 13. The animal's next move is in an effort to secure the bait, and in so doing he is pricked by the prongs or spurs 17 projecting from the bottom of the bait holder and radially disposed from approximately the center of the body, presenting a porcupine effect. The spurs further protect the mouth of the animal from engaging or touching the bait contained in the bait holder, whereby prevents the bait contained in the bait holder from attracting the holder of the animal entering such trap and therefore does not necessitate a renewal of bait in order to make the trap effective. Failing to secure the bait after several attempts, the animal makes an effort to escape, but being unable to do so through the entrance passage by reason of the fact that the latter is closed by the door 13 he succeeds in passing through the opening 18 in the partition 12 only to find himself trapped in the compartment 11, the opening 18 being controlled by a vertically swinging door 19 constructed similarly to the door 13. The free ends of the wire strands 20 of the door 19 also terminate in sharp points and are so disposed with relation to the bottom as to prick the animal in an effort on his part to escape.

The animals are retained in the compartment 11 until it is desired to kill or otherwise dispose of the same, at which time they are released through the exit opening 22 in the rear end wall 8, the latter being controlled by the door 23 held in closed position by a suitable latch means 24.

Hinged to the top 9 is a closure 25 which extends over the bait holder to protect the bait, and secured in closed position by the latch means 26.

It is believed that from the foregoing description the nature and advantages of the invention will be readily apparent without requiring a more extended explanation and therefore the same has been omitted.

What I claim is:—

1. A cup adapted for use in a trap, consisting of an open work body and prongs mounted on the body for preventing the mouth of the entrapped animal from contacting with the contents of the cup.

2. A cup adapted for use in a trap, consisting of a body, and prongs mounted on the body and radially disposed from approximately the center portion of the body for preventing the mouth of the entrapped animal from contacting with the contents of the bait.

In testimony whereof I affix my signature in presence of two witnesses.

DANTES R. REEFE.

Witnesses:
BERTHA KNOWLES,
D. A. DORSEY.